US010823565B2

(12) United States Patent
Winter et al.

(10) Patent No.: US 10,823,565 B2
(45) Date of Patent: Nov. 3, 2020

(54) METHOD FOR MEASURING A MEASUREMENT DISTANCE BETWEEN A ROTATING LASER AND A LASER RECEIVER

(71) Applicant: Hilti Aktiengesellschaft, Schaan (LI)

(72) Inventors: Andreas Winter, Feldkirch (AT); Guenter Sanchen, Grabs (CH); Sasha Lukic, Buchs (CH)

(73) Assignee: Hilti Aktiengesellschaft, Schaan (LI)

(*) Notice: Subject to any disclaimer, the term of this patent is extended or adjusted under 35 U.S.C. 154(b) by 349 days.

(21) Appl. No.: 15/778,599

(22) PCT Filed: Nov. 23, 2016

(86) PCT No.: PCT/EP2016/078484
§ 371 (c)(1),
(2) Date: Jan. 31, 2019

(87) PCT Pub. No.: WO2017/093085
PCT Pub. Date: Jun. 8, 2017

(65) Prior Publication Data
US 2019/0154443 A1    May 23, 2019

(30) Foreign Application Priority Data
Nov. 30, 2015   (EP) .................................. 15197025

(51) Int. Cl.
*G01C 15/00*     (2006.01)
*G01C 3/20*      (2006.01)
(Continued)

(52) U.S. Cl.
CPC ............. *G01C 15/006* (2013.01); *G01C 3/20* (2013.01); *G01C 15/004* (2013.01);
(Continued)

(58) Field of Classification Search
CPC ...... G01C 15/006; G01C 15/004; G01C 3/20; G01C 15/12; G01C 2009/066; G01C 9/06;
(Continued)

(56) References Cited

U.S. PATENT DOCUMENTS 6,693,706 B2     2/2004  Kahle et al.
8,869,411 B2 *  10/2014  Lukic ................... G01C 15/004
                                                33/228
(Continued)

FOREIGN PATENT DOCUMENTS

DE    197 16 710 A1   11/1997
EP    1 203 930 B1     5/2002
EP    3173740 A1 *     5/2017   ............... G01C 3/20

OTHER PUBLICATIONS

PCT/EP2016/078484, International Search Report (PCT/ISA/220 and PCT/ISA/210) dated Feb. 14, 2017, with partial English translation, enclosing Written Opinion of the International Searching Authority (PCT/ISA/237) (Thirteen (13) pages).
(Continued)

*Primary Examiner* — Yaritza Guadalupe-McCall
(74) *Attorney, Agent, or Firm* — Crowell & Moring LLP

(57) ABSTRACT

A method for measuring a measurement distance between a rotating laser, which emits a first laser beam that can be rotated about a rotational axis and/or a stationary second laser beam, and a laser receiver, which has a detection field with a measurement function. The rotating laser is inclined in a direction of inclination by an inclination angle. The position of incidence of the inclined laser beam on the detection field of the laser receiver is determined as a measurement point. The distance between the measurement point and a zero position of the detection field is stored as the height, and the measurement distance between the rotating
(Continued)

laser and the laser receiver is determined using the inclination angle and the height.

11 Claims, 7 Drawing Sheets

(51) Int. Cl.
    *G01S 17/42*     (2006.01)
    *G01S 7/481*     (2006.01)
    *G01S 7/51*     (2006.01)
    *G01S 7/497*     (2006.01)
    *G01S 17/86*     (2020.01)

(52) U.S. Cl.
    CPC .......... *G01S 7/4813* (2013.01); *G01S 7/4817* (2013.01); *G01S 7/497* (2013.01); *G01S 7/4972* (2013.01); *G01S 7/51* (2013.01); *G01S 17/42* (2013.01); *G01S 17/86* (2020.01)

(58) Field of Classification Search
    CPC ........ G01S 17/86; G01S 7/497; G01S 7/4972; G01S 17/42; G01S 7/4813; G01S 7/4817; G01S 7/51; G01B 11/14; G01B 11/06; G01B 11/24; G01B 11/25
    USPC .......................................................... 33/290
    See application file for complete search history.

(56) References Cited

U.S. PATENT DOCUMENTS

| | | | | |
|---|---|---|---|---|
| 10,564,033 | B2* | 2/2020 | Lukic | G01C 15/006 |
| 10,684,129 | B2* | 6/2020 | Lukic | G01C 25/00 |
| 10,697,796 | B2* | 6/2020 | Lukic | G01C 15/004 |
| 2008/0015811 | A1* | 1/2008 | Conner | G01C 15/002 |
| | | | | 702/159 |
| 2019/0154443 | A1* | 5/2019 | Winter | G01C 15/004 |

OTHER PUBLICATIONS

U.S. Patent Application, "Method for Orienting a Device Axis in a Defined State", filed May 23, 2018, Inventor: Sasha Lukic.

U.S. Patent Application, "Method for Measuring an Operating Temperature of Equipment", filed May 23, 2018, Inventor: Sasha Lukic.

U.S. Patent Application, "Method for Checking and/or Calibrating a Horizontal Axis of a Rotating Laser", filed May 23, 2018, Inventor: Sasha Lukic et al.

U.S. Patent Application, "Method for Checking a Rotary Laser Level for Cone Errors", filed May 23, 2018, Inventor: Sasha Lukic.

U.S. Patent Application, "Method for Checking and/or Calibrating a Vertical Axis of a Rotating Laser", filed May 23, 2018, Inventor: Sasha Lukic et al.

* cited by examiner

METHOD FOR MEASURING A MEASUREMENT DISTANCE BETWEEN A ROTATING LASER AND A LASER RECEIVER

CROSS REFERENCE TO RELATED APPLICATIONS

This application claims the priority of International Application No. PCT/EP2016/078484, filed Nov. 23, 2016, and European Patent Document No. 15197025.8, filed Nov. 30, 2015, the disclosures of which are expressly incorporated by reference herein.

BACKGROUND AND SUMMARY OF THE INVENTION

The invention relates to a method for measuring a measurement distance between a rotating laser and a laser receiver.

Rotating lasers are used in indoor and outdoor areas for leveling and marking work, such as displaying horizontal, vertical or inclined laser marks on a target surface or the determination and checking of horizontal height levels, vertical lines, alignment and perpendicular points. Rotating lasers can be configured in various orientations that are characterized as a horizontal position or vertical position. A distinction is drawn between rotating lasers that can be used in horizontal applications and are implemented exclusively in a horizontal position and rotating lasers that can be used in horizontal and vertical applications and are implemented in horizontal and vertical positions. Rotating lasers for horizontal implementation have a first horizontal axis and a second horizontal axis as device axes that are perpendicular to each other and that define a horizontal plane. In addition to the first and second horizontal axes, rotating lasers for horizontal and vertical implementation have a vertical axis that is perpendicular to the horizontal plane of the first and second horizontal axes.

In order to ensure the accuracy of a rotating laser in operation, its accuracy must be regularly checked, and the rotating laser must be recalibrated if it exceeds the maximum difference defined by the equipment manufacturer. The accuracy of the rotating laser is checked separately for each device axis. Methods for checking and/or calibrating a horizontal axis and methods for checking and/or calibrating a vertical axis are known. For rotating lasers for horizontal implementation, the first and second horizontal axes are checked in sequence, where the order is arbitrary. For rotating lasers for horizontal and vertical implementation, the vertical axis is checked after the check of the first and second horizontal axes.

When checking and/or calibrating a device axis of a rotating laser, the rotating laser is positioned at a measurement distance from a measurement surface. The measurement distance between a rotating laser and the measurement surface is either specified, e.g., 30 m, or is measured during of procedure. In both cases, a measurement of the measurement distance is necessary; in the first case in order to ensure that the specified measurement distance is complied with and in the second case in order to determine the measurement distance. The measurement distance can be determined using a known laser distance measuring device. A known alternative is to determine the measurement distance between a rotating laser and a laser receiver using the rotating laser and the laser receiver.

DE 197 16 710 A1 discloses three variants of a method for measuring a measurement distance between a rotating laser and a laser receiver. The variants differ in the configuration of the rotating laser, of the laser receiver or of the rotating laser and the laser receiver. The rotating laser generates a laser beam rotating about an axis of rotation. The laser receiver comprises a detection field with a detection width and a detection height. The measurement distance between the rotating laser and the laser receiver is measured in the horizontal position of the rotating laser and longitudinal arrangement of the laser receiver.

In the first variant, the laser receiver has a signal source that sends a control signal to the rotating laser on incidence of a laser beam on the detection field, whereby a time measuring device determines a time difference between the emission of the laser beam from the rotating laser to the laser receiver and detection of the control signal at the rotating laser. The measurement distance between the rotating laser and the laser receiver is determined from the propagation speed of the laser beam, the propagation speed of the control signal and the measured time difference. In the second and third variants, the laser receiver has two detection fields that are configured parallel to each other at a known distance relative to each other. The rotating laser beam strikes the first detection field and triggers a first control signal that is sent from the laser receiver to the rotating laser, and then strikes the second detection field and triggers a second control signal that is sent from the laser receiver to the rotating laser. In the second variant, the rotating laser is equipped with an angle measuring device that measures an angle of rotation, whereby the angle of rotation indicates the angular position of the rotating laser in a plane normal to the axis of rotation. When the first control signal strikes the rotating laser, a first angle of rotation is determined, and when the second control signal strikes the rotating laser, a second angle of rotation is determined. The measurement distance is determined from the distance between the first and second detection fields and the angle difference between the first and second angles of rotation. In the third variant, the rotating laser or the laser receiver is equipped with a measuring device that measures the time difference required by the rotating laser beam to pass from the first detection field to the second detection field when rotating at a constant rotational speed. The measurement distance between the rotating laser and the laser receiver is determined from the distance between the first and second detection fields, the measured time difference and the rotational speed of the rotating laser.

The variants proposed in DE 197 16 710 A1 for measuring a measurement distance between a rotating laser and a laser receiver have several disadvantages. All of the variants require a special laser receiver. In the first and second variants the laser receiver requires a signal source that generates a control signal and transmits it to the rotating laser when a laser beam strikes the detection field of the laser receiver, and the rotating laser requires a receiver that receives and transmits the control signal. In the second and third variants, a laser receiver with two parallel detection fields is required.

The task of the present invention lies in the development of a method for measuring a measurement distance between a rotating laser and a laser receiver in which the measurement distance in both the horizontal position of the rotating laser as well as in the vertical position of the rotating laser can be measured. Furthermore, the necessary equipment expenditure must be as low as possible, i.e., if possible, the measurement distance must be measurable using a conventional rotating laser and a conventional laser receiver.

According to the invention, the rotating laser is inclined from the defined state by an angle of inclination α in a direction of inclination, the position of incidence of the inclined laser beam on the detection field of the laser receiver is determined as a first measuring point, the distance of the first measuring point from a zero position of the laser receiver is stored as a first height $h_1=h(\alpha)$ and the measurement distance between the rotating laser and the laser receiver is determined as the first distance $d_1$ from the angle of inclination α and the first height $h_1=h(\alpha)$.

The method according to the invention can be used to easily determine the measurement distance between the rotating laser and the laser receiver and requires no additional components. The method according to the invention requires a laser receiver with a measurement function and a rotating laser with a leveling device for the device axes. The laser receiver measures the distance of a measuring point generated by a laser beam on the detection field from the zero position of the laser receiver. The leveling device has a leveling unit with an inclination sensor and an adjusting element for each device axis of the rotating laser.

The measurement distance between the rotating laser and the laser receiver can be measured in the horizontal position and in the vertical position of the rotating laser. A horizontal state of the rotating laser is used as a defined state in the horizontal position of the rotating laser and a vertical state of the rotating laser is used as a defined state in the vertical position of the rotating laser. The laser receiver is aligned in a longitudinal arrangement if the rotating laser is aligned in the horizontal position and it is oriented in a transverse arrangement if the rotating laser is aligned in the vertical position. The alignment of the laser receiver is defined with the detection field and a vertical direction. The detection field of the laser receiver with which the position of incidence of a laser beam is registered has a detection height $H_D$ in a longitudinal direction and a detection width $B_D$ in a transverse direction. The longitudinal direction corresponds to the measurement direction of the laser receiver and the transverse direction is aligned perpendicular to the longitudinal direction, whereby the longitudinal and transverse directions are parallel to the top side of the detection field. The alignment of the laser receiver in which the longitudinal direction of the detection field is aligned parallel to the vertical direction is designated as a longitudinal arrangement, and the alignment of the laser receiver in which the transverse direction of the detection field is aligned perpendicular to the vertical direction is designated as a transverse arrangement.

In a first variant, the position of incidence of the laser beam on the detection field of the laser receiver in the defined state of the rotating laser is determined as a reference point, the distance of the reference point from the zero position of the detection field is stored as the reference height $h_0$ and the first distance $d_1$ is calculated from the angle of inclination α and a difference $\Delta h=h_1-h_0$ between the first height $h_1$ and the reference height $h_0$. If the laser receiver is aligned parallel to the vertical direction, the relationship $\tan(\alpha)=\Delta h/d_1$ applies for the first distance $d_1$. For a small angle of inclination α, as an approximation $\tan(\alpha)\approx\sin(\alpha)$. The first variant is especially suitable for rotating lasers and laser receivers with an auto-alignment function in which the height adjustment of the laser beam with the zero position of the detection field of the laser receiver can be performed automatically.

In a second variant, the laser beam is set to a zero position on the detection field with the rotating laser in the defined state, the laser beam is inclined from the zero position by an angle of inclination α and the first distance $d_1$ is calculated from the angle of inclination α and a difference between the first height $h_1=h(\alpha)$ and the zero position of the detection field. If the laser receiver is aligned parallel to the vertical direction, the relationship $\tan(\alpha)=h_1/d_1$ applies for the first distance $d_1$. For a small angle of inclination α, as an approximation $\tan(\alpha)\approx\sin(\alpha)$. The second variant is suitable for a rotating laser and laser receiver without an auto-alignment function. The operator must only ensure that the laser beam inclined by angle of inclination α from the detection field of the laser receiver is registered. For a rotating laser and laser receiver with an auto-alignment function, the laser beam is automatically moved into the area of the detection field.

In a third variant, the rotating laser is also inclined in an opposing direction of inclination by a negative angle of inclination $-\alpha$, the position of incidence of the inclined laser beam on the detection field of the laser receiver is determined as a second measurement point, the distance of the second measurement point from the zero position of the detection field is stored as a second height $h_2=h(-\alpha)$ and the first distance $d_1$ is calculated from the angle of inclination α and a difference $\Delta h=h_1-h_2$ between the first height $h_1=h(\alpha)$ and the second height $h_2=h(-\alpha)$. If the laser receiver is aligned parallel to the vertical direction, the relationship $\tan(\alpha)=(h(\alpha)-h(-\alpha))/2d_1=\Delta h/2d_1$ applies for the first distance ($d_1$). For a small angle of inclination α, as an approximation $\tan(\alpha)\approx\sin(\alpha)$. The third variant is suitable for a rotating laser and laser receiver with and without an auto-alignment function. If the laser beam is initially aligned with the zero position of the detection field or at least in the vicinity of the zero position, the entire detection height of the detection field can be used. For an equipment system with an auto-alignment function, the height adjustment to the zero position can be performed automatically.

In a first further development of the procedure, the rotating laser is aligned in the horizontal position and the laser receiver is aligned in the longitudinal arrangement and the horizontal measurement distance $D_H$ between the rotating laser and the laser receiver is also determined as a second distance $d_2$ with a second measurement procedure. The second measurement method comprises the following steps: The rotating laser is aligned in the horizontal state, the rotating first laser beam is rotated in the horizontal state with a rotational speed $v_R$ about the axis of rotation of the rotating laser, the signal length of the rotating first laser beam on the detection field of the laser receiver is determined and the second distance $d_2$ is calculated from the rotational speed $v_R$ of the rotating first laser beam, the signal length of the rotating first laser beam and a detection width $B_D$ of the detection field.

In a second further development of the procedure, the rotating laser is aligned in the vertical position and the laser receiver is aligned in the transverse arrangement and the vertical measurement distance $D_H$ between the rotating laser and the laser receiver is also determined as a second distance $d_2$ with a second measurement procedure. The second measurement method comprises the following steps: The rotating laser is aligned in the vertical state, the second laser beam is moved in the vertical state at a speed $v_R$, the signal length of the second laser beam on the detection field of the laser receiver is determined and the second distance $d_2$ is calculated from the speed $v_R$ of the second laser beam, the signal length of the second laser beam and a detection width $B_D$ of the detection field.

It is especially preferable to calculate the measurement distance between the rotating laser and the laser receiver as an average distance d of the first distance $d_1$ and the second distance $d_2$. By averaging the first and second distances, the accuracy with which the measurement distance between the rotating laser and the laser receiver can be determined can be increased. The first distance determined by the first measurement procedure is greater than or equal to the actual measurement distance. If the laser receiver is not parallel to the vertical direction in the longitudinal arrangement or is not perpendicular to the vertical direction in the transverse arrangement, but rather is inclined relative to the vertical direction, the vertical or horizontal distance is less than the distance measured by the detection field of the laser receiver. The second distance determined by the second measurement procedure is less than or equal to the actual measurement distance. If the laser receiver is not parallel to the vertical direction in the longitudinal arrangement or is not perpendicular to the vertical direction in the transverse arrangement, but rather is inclined relative to the vertical direction, the horizontal or vertical distance traversed by the rotating laser beam on the detection field is greater than the detection width $B_D$ of the detection field.

In a further development of the procedure, an inclination of the laser receiver relative to a vertical direction is determined as a first vertical angle $\varphi_1$ in a first vertical plane and/or as a second vertical angle $\varphi_2$ in a second vertical plane, whereby the first vertical plane is determined by the vertical direction and a longitudinal direction of the detection field and the second vertical plane is determined by the vertical direction and a transverse direction of the detection field. An inclination of the laser receiver from the perpendicular direction changes the dimensions of the detection field (detection width and detection height). If the angle of the laser receiver is known, the dimensions can be corrected accordingly. The laser receiver can be inclined by the first and second vertical angles relative to the vertical direction. The first vertical angle $\varphi_1$ is measured between the normal vector of the detection field and the vertical direction, whereby the first vertical angle $\varphi_1$ represents the deviation from 90° between the normal vector and the vertical direction and the second vertical angle $\varphi_2$ is measured between the vertical direction and the longitudinal direction of the detection field. The inclination of the laser receiver can be measured using a 2-axis accelerometer or with two 1-axis accelerometers.

The inclination of the laser receiver relative to a vertical direction is accounted for when measuring the horizontal and vertical measurement distance. For measurement of the horizontal measurement distance $D_H$, the first vertical angle $\varphi_1$ and/or the second vertical angle $\varphi_2$ are multiplied by an angle-dependent correction factor ($\cos(\varphi_1)$, $\cos(\varphi_2)$, $1/\cos(\varphi_2)$) in the evaluation with the laser receiver. For measurement of the vertical measurement distance $D_V$, the first vertical angle $\varphi_1$ and/or the second vertical angle $\varphi_2$ are multiplied by an angle-dependent correction factor ($\cos(90°-\varphi_1)$, $\cos(90°-\varphi_2)$, $1/\cos(90°-\varphi_2)$) in the evaluation with the laser receiver. The inclination of the laser receiver by the first vertical angle $\varphi_1$, the second vertical angle $\varphi_2$ or the first and second vertical angles $\varphi_1$, $\varphi_2$ can be compensated by multiplying by one or more angle-dependent correction factors. The formulas for calculating the horizontal measurement distance $D_H$ apply for a laser receiver that is aligned parallel with the vertical direction, and the formulas for calculating the vertical measurement distance $D_V$ apply for a laser receiver that is aligned perpendicular to the vertical direction, whereby the alignment of the laser receiver is defined by the longitudinal direction of the detection field.

In the formulas that use the measurement function of the laser receiver and measure distances on the detection field in the longitudinal direction, the distances are multiplied by a correction factor $\cos(90°-\varphi_1)=\sin(\varphi_1)$ for the first vertical angle $\varphi_1$ and a correction factor $\cos(90°-\varphi_2)=\sin(\varphi_2)$ for the second vertical angle $\varphi_2$. When measuring the horizontal measurement distance $D_H$, the distances measured on the detection field in the longitudinal direction are multiplied by a correction factor $\cos(\varphi_1)$ for the first vertical angle $\varphi_1$ and a correction factor $\cos(\varphi_2)$ for the second vertical angle $\varphi_2$ if the first vertical angle $\varphi_1$ and/or the second vertical angle $\varphi_2$ differ from zero. When measuring the vertical measurement distance $D_V$, the distances measured on the detection field in the longitudinal direction are multiplied by a correction factor $\cos(90°-\varphi_1)=\sin(\varphi_1)$ for the first vertical angle $\varphi_1$ and a correction factor $\cos(90°-\varphi_2)=\sin(\varphi_2)$ for the second vertical angle $\varphi_2$ if the first vertical angle $\varphi_1$ and/or the second vertical angle $\varphi_2$ differ from zero.

In the distance measurement of the horizontal or vertical measurement distance $D_H$, $D_V$ as a second distance using the second measurement procedure, the usual measurement function of the laser receiver in the longitudinal direction is not used, but rather the detection width in the transverse direction. Because of the inclination of the laser receiver in the second vertical plane by the second vertical angle $\varphi_2$, the distance the laser beam traverses on the detection field is larger than the detection width $B_D$ of the detection field. The signal length of the laser beam corresponds to the distance on the detection field. The relationship $B_D/\cos(\varphi_2)$ applies for the distance on measurement of the horizontal measurement distance $D_H$, and relationship $B_D/\cos(90°-\varphi_2)=B_D/\sin(\varphi_2)$ applies on measurement of the vertical measurement distance $D_V$. An inclination of the laser receiver by the first vertical angle $\varphi_1$ does not change the distance the laser beam traverses on the detection field.

Example embodiments of the invention are described below based on the drawings. This is not intended to necessarily represent the example embodiments to scale, instead the drawings are shown in schematic and/or slightly distorted form where useful for explanation purposes. It must be taken into account here that many modifications and changes affecting the form and that detail of a design can be implemented without deviating from the general concept of the invention. The general concept of the invention is not limited to the exact form or detail of the preferred design shown and described below or limited to an object that would be limited in comparison with the object described in the claims. Values within the specified limits for given dimensional ranges should also be indicated as limits and should be arbitrarily applicable and claimable. For the sake of simplicity, the same reference numbers are used below for identical or similar parts or parts with identical or similar functions.

DETAILED DESCRIPTION OF THE DRAWINGS

Figure 1A:
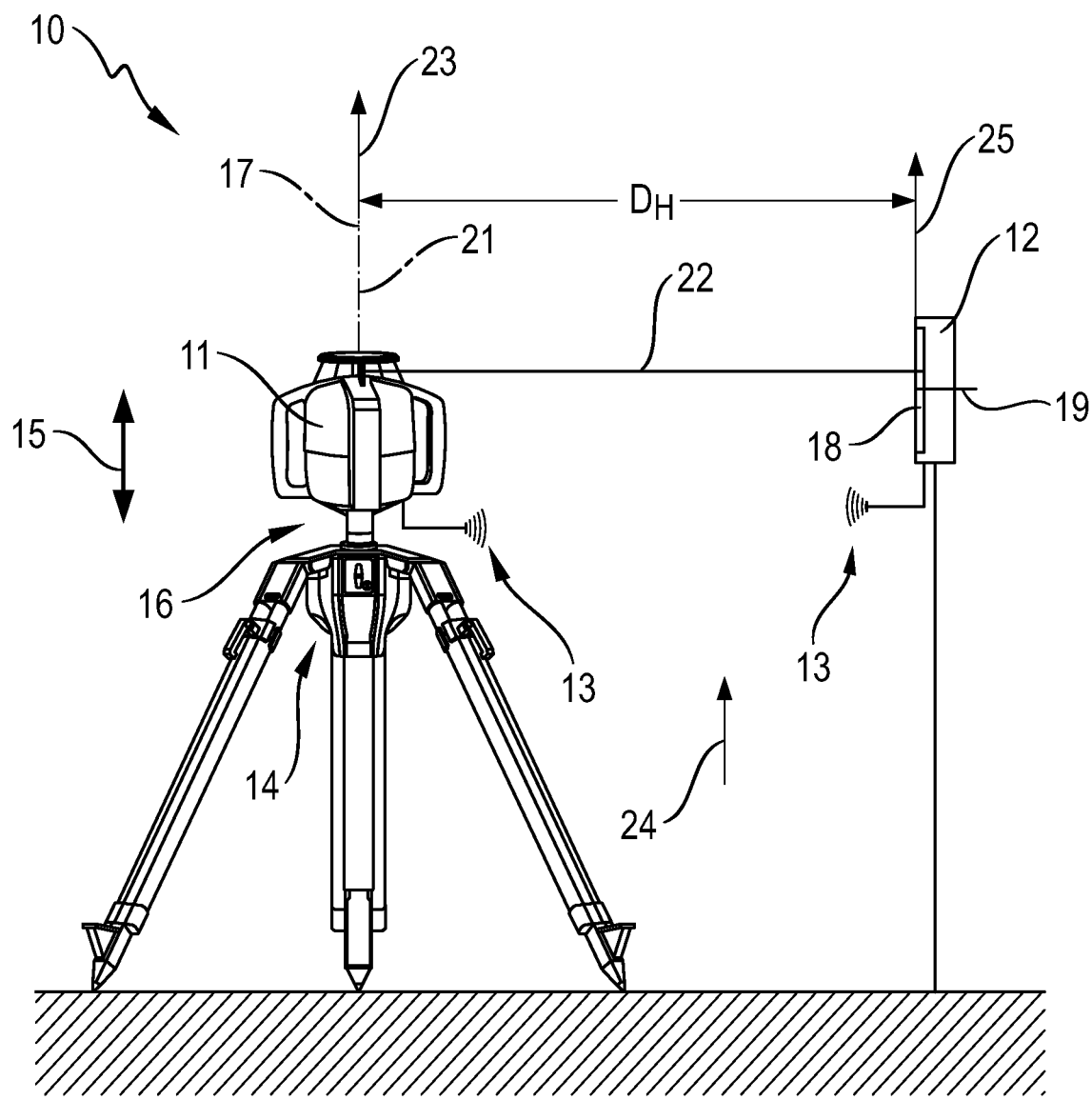
FIGS. 1A, B show a device for measuring a measurement distance between a rotating laser and a laser receiver in the horizontal position of the rotating laser and longitudinal arrangement of the laser receiver (FIG. 1A) as well as in the vertical position of the rotating laser and transverse arrangement of the laser receiver (FIG. 1B)
Figure 1B:
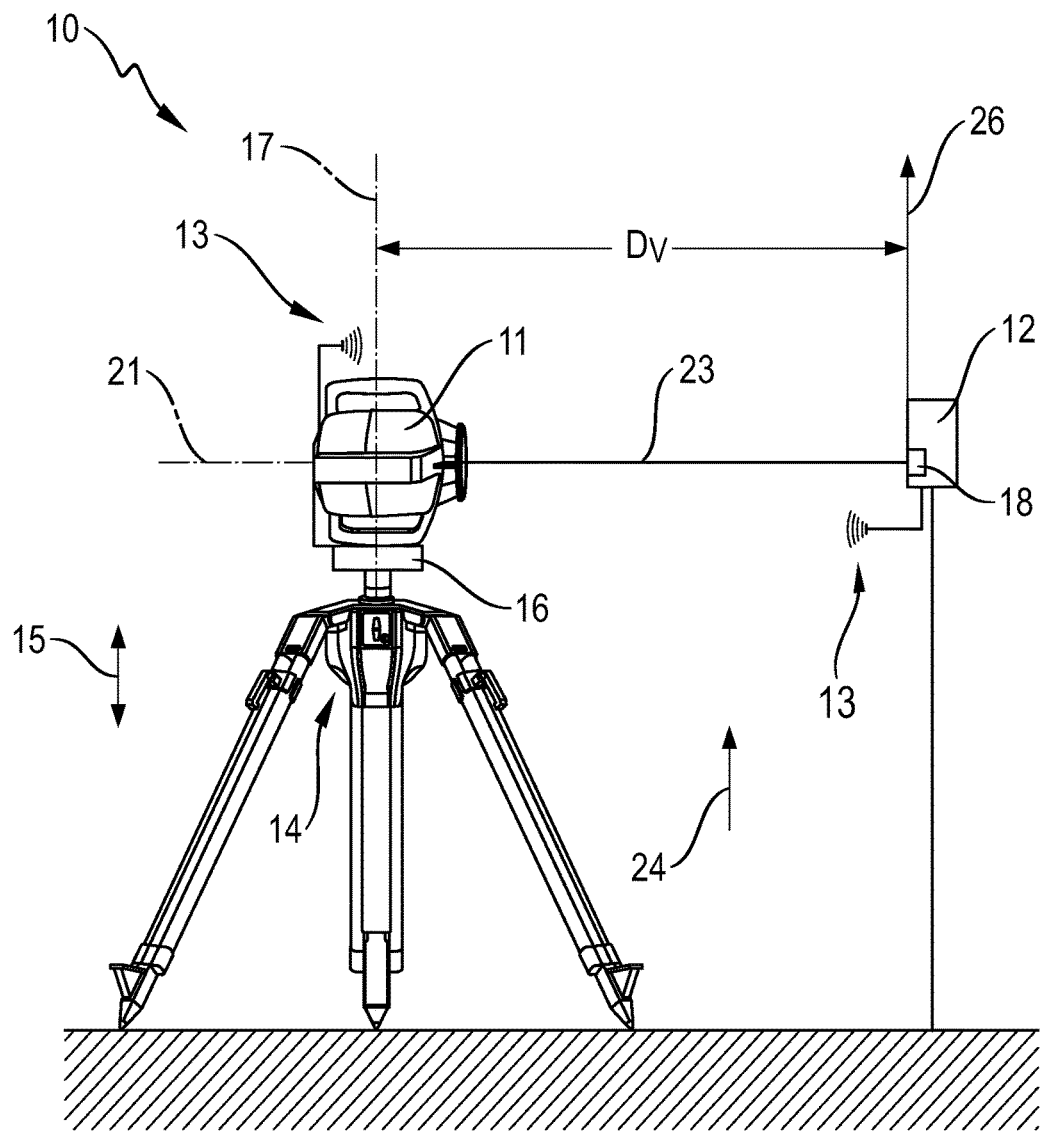

FIGS. 1A, B show a device 10 with a rotating laser 11 and a laser receiver 12 that can be connected via a wireless communications connection 13. FIG. 1A shows rotating laser 11 in a horizontal position intended for horizontal applications of rotating laser 11, and FIG. 1B shows rotating laser 11 in a vertical position intended for vertical applications of rotating laser 11. Rotating laser 11 is mounted on a motor-driven stand 14 that enables automatic height adjustment of rotating laser 11 in a height direction 15. A rotating platform 16 can also be provided that enables automatic angle adjustment of rotating laser 11 about an axis of rotation 17 of rotating platform 16. Rotating platform 16 can be integrated in stand 14 or implemented as a separate component that is mounted on stand 14.

Laser receiver 12 is equipped with a measurement function that determines a position of incidence of a laser beam on a detection field 18 of laser receiver 12 and provides the distance of the laser beam from zero position 19 of detection field 18. Rotating laser 11 is implemented as a rotating laser for horizontal and vertical implementation with a first laser beam 22 rotating about axis of rotation 21 of rotating laser 11 and a stationary second laser beam 23. Rotating first laser beam 22 generates a laser plane oriented perpendicular to axis of rotation 21, and the second laser beam 23 is directed perpendicular to the laser plane of the first laser beam 22.

The alignment of laser receiver 12 is defined with detection field 18 and a vertical direction 24. Detection field 18 of laser receiver 12 with which the position of incidence of the first or second laser beams 22 and 23 is registered has a detection height $H_D$ in a longitudinal direction 25 and a detection width $B_D$ in a transverse direction 26. Longitudinal direction 25 corresponds to the measurement direction of laser receiver 12 and transverse direction 26 is aligned perpendicular to longitudinal direction 25, whereby longitudinal and transverse directions 25 and 26 are parallel to the top side of detection field 18. The alignment of laser receiver 12 in which longitudinal direction 25 of detection field 18 is aligned parallel to vertical direction 24 is designated as the longitudinal arrangement, and the alignment of laser receiver 12 in which transverse direction 26 of detection field 18 is aligned parallel to vertical direction 24 is designated as the transverse arrangement.

FIG. 1A shows rotating laser 11 in the horizontal position and laser receiver 12 in the longitudinal arrangement for measuring a horizontal measurement distance $D_H$ corresponding to the distance between the center of an optical deflector of rotating laser 11 and the top side of detection field 18 of laser receiver 12. Horizontal measurement distance $D_H$ is measured using the first rotating laser beam 22 that is directed on detection field 18 of laser receiver 12 in the longitudinal arrangement. FIG. 1B shows rotating laser 11 in the vertical position and laser receiver 12 in the transverse arrangement for measuring a vertical measurement distance $D_V$ corresponding to the distance between the center of the optical deflector of rotating laser 11 and the top side of detection field 18 of laser receiver 12. Vertical measurement distance $D_V$ is measured using the second stationary laser beam 23 that is directed on detection field 18 of laser receiver 12 in the transverse arrangement. The horizontal position of the center of the optical deflector of rotating laser 11 corresponds to axis of rotation 21 of rotating laser 11.

Figure 2A:
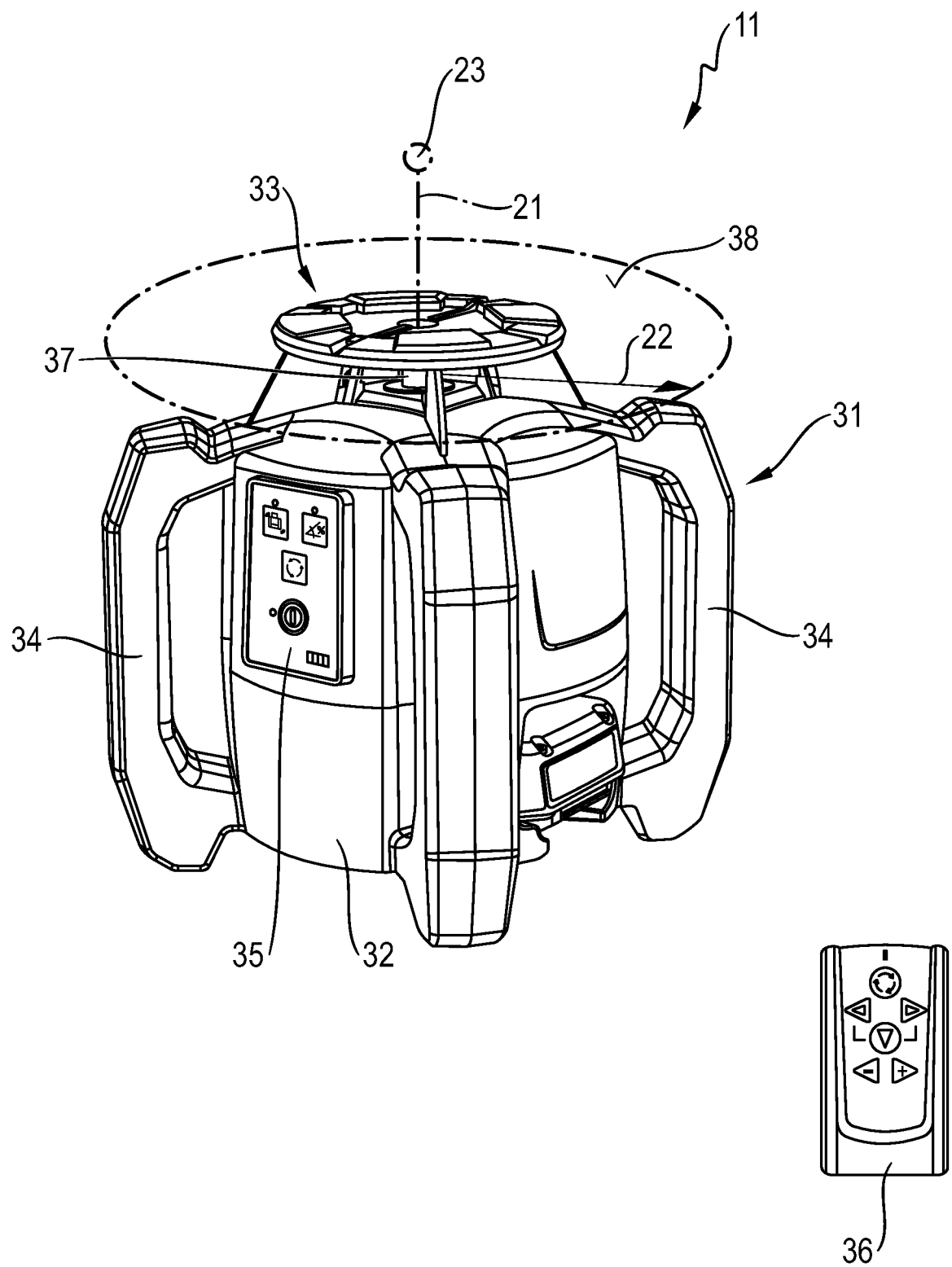
FIGS. 2A-C show the rotating laser of FIG. 1 in a three-dimensional representation (FIG. 2A) and the key components of rotating laser 11 in a schematic representation in a vertical plane (FIG. 2B) and a horizontal plane (FIG. 2C)
Figure 2B:
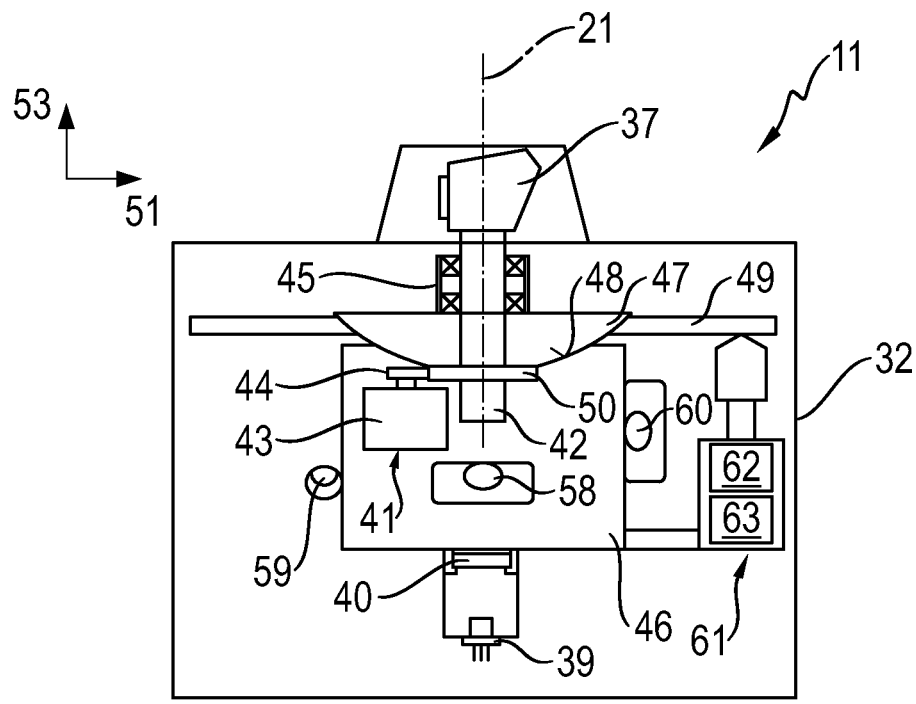
Figure 2C:
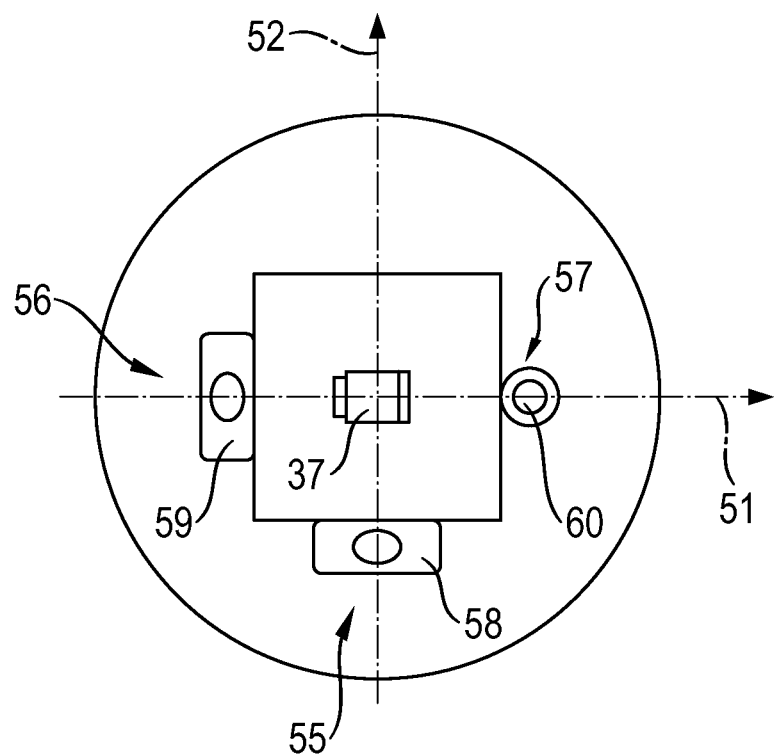

FIGS. 2A-C show rotating laser 11 in a three-dimensional representation (FIG. 2A) and the key components of rotating laser 11 in a schematic representation, whereby FIG. 2B shows the components in a vertical plane parallel to axis of rotation 21 and FIG. 2C shows the components in a horizontal plane perpendicular to axis of rotation 21.

Rotating laser 11 comprises a housing 31 and a measurement device configured in housing 31. Housing 31 consists of a main housing 32, a rotating head 33 and multiple handles 34. Rotating laser 11 is operated via operating panel 35, which is integrated in main housing 32 and can be operated from the outside. In addition to operating panel 35 integrated in main housing 32, a remote control 36 can be provided that can be connected with rotating laser 11 via a communications connection. The measurement device of rotating laser 11 generates a laser beam in the interior of main housing 32 that strikes an optical deflector 37 rotating about axis of rotation 21. A first component of the laser beam is deflected 90° by optical deflector 37 and forms the first laser beam 22 of rotating laser 11 that determines laser plane 38. A second component of the laser beam passes through optical deflector 37 and forms the second laser beam 23 of rotating laser 11. A rotation mode, a line mode and a point mode of rotating laser 11 are distinguished depending on the rotational speed at which first laser beam 22 is rotated about axis of rotation 21.

FIGS. 2B, C show the key components of rotating laser 11 in a schematic representation. Rotating laser 11 comprises a laser device with a beam source 39 that generates a laser beam and an optical collimator 40. For example, beam source 39 is implemented as a semiconductor laser that generates the laser beam in the visible spectrum, such as a red laser beam with a wavelength of 635 nm or a green laser beam with a wavelength of 532 nm. After the laser beam exits beam source 39, the laser beam is collimated by optical collimator 40. As an alternative, the optical collimator can be integrated in the beam source, or the optical collimator can be omitted for a beam source 39 with a high beam quality and small divergence.

The collimated laser beam strikes optical deflector 37 that splits the first and second laser beams 22 and 23. Optical deflector 37 is connected to a turning device 41 that rotates optical deflector 37 about axis of rotation 21. Turning device 41 comprises a rotating shaft 42, a motor unit 43 and a transmission device 44 implemented, for example, in the form of a toothed belt that transmits the movement of motor unit 43 to shaft 42. Optical deflector 37 is coupled to rotating shaft 42 and is designed to rotate about axis of rotation 21. Shaft 42 is supported in a rotating bearing 45 in a stationary part 46 that is connected with a spherical head 47. Spherical head 47 is supported in spherical bearing 48 in a frame 49 fixed to the housing for pivoting in two vertical pivot planes perpendicular to the plane of rotation (the plane perpendicular to axis of rotation 21). Rotating laser 11 comprises a measuring device 50 that measures the angle of rotation of shaft 42 about axis of rotation 21. As an example, measuring device 50 is implemented as an angle encoder and consists of a measuring disc that is securely connected to turn with shaft 42, a scanning device with which the measuring disc is scanned and an evaluation and control element.

Rotating laser 11 is implemented as a rotating laser for horizontal and vertical applications, whereby an additional device axis distinguishes a rotating laser for horizontal and vertical applications from a rotating laser for horizontal applications. Rotating laser 11 has a first horizontal axis 51 and a second horizontal axis 52 as device axes that are perpendicular to each other and that define a device plane. First and second horizontal axes 51 and 52 are indicated by indicator elements on rotation head 33 of rotating laser 11. In addition to first and second horizontal axes 51 and 52, rotating laser 11 for horizontal and vertical applications have an additional device axis designated as vertical axis 53 and is ideally oriented perpendicular to the device plane determined by first and second horizontal axes 51 and 52.

Rotating laser 11 is implemented as a self-leveling rotating laser that automatically levels itself when housing 31 of rotating laser 11 is set up within a self-leveling range. The self-leveling range of rotating lasers is typically at 5°. Rotating laser 11 comprises a leveling device that aligns the device axes of rotating laser 11 in a defined state independently from any alignment of housing 31. The leveling device comprises a first leveling unit 55 that aligns the first horizontal axis 51 in a first defined state a second leveling unit 56 that aligns the second horizontal axis 52 in a second defined state and a third leveling unit 57 that aligns vertical axis 53 in a third defined state.

The first leveling unit 55 comprises a first inclination sensor 58 and a first adjusting element, second leveling unit 56 comprises a second inclination sensor 59 and a second adjusting element and third leveling unit 57 comprises a third inclination sensor 60 and a third adjusting element. The adjusting elements of leveling units 55, 56 and 57 are integrated in an inclination device 61 that has a first positioning motor 62 and a second positioning motor 63. The first positioning motor 62 pivots frame 49 about a first pivot axis that coincides with second horizontal axis 52 and the second positioning motor 63 pivots frame 49 about a second pivot axis that coincides with first horizontal axis 51. The first positioning motor 62 forms the first adjusting element of first leveling unit 55 and the second positioning motor 63 forms the second adjusting element of second leveling unit 56. Because vertical axis 53 is aligned perpendicular to the horizontal plane of the first and second horizontal axis 51 and 52, the alignment of vertical axis 53 can be set using the first and second positioning motors 62 and 63. The first and second positioning motors 62 and 63 together form the third adjusting element of third leveling unit 57.

Horizontal alignment of the laser plane or the device plane represents a preferred defined state in which a rotating laser 11 is to be aligned in a horizontal position, whereby the horizontally aligned device plane is also designated as the horizontal plane. Vertical alignment of the laser plane or the device plane represents a preferred defined state in which a rotating laser 11 is to be aligned in a vertical position, whereby the vertically aligned device plane is also designated as the vertical plane. Laser plane 38 generated by rotating first laser beam 22 can be inclined relative to the horizontal plane or the vertical plane of rotating laser 11 using inclination device 61. Rotating laser 11 can incline the laser plane of rotating first laser beam 22 in one direction of inclination or in two directions of inclination. The laser plane is inclined in the leveled condition of rotating laser 11. Rotating laser 11 can be inclined in the horizontal or vertical position.

Figure 3A:
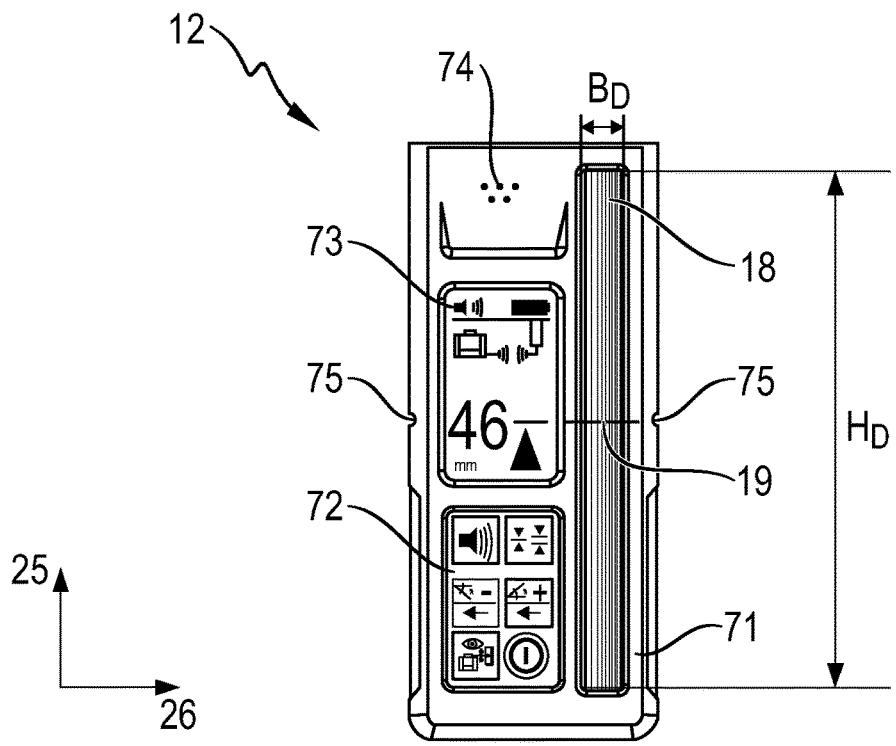
FIGS. 3A, B show the laser receiver of FIG. 1 in a three-dimensional representation (FIG. 3A) and the key components of the laser receiver and of the rotating laser in a schematic representation (FIG. 3B)
Figure 3B:
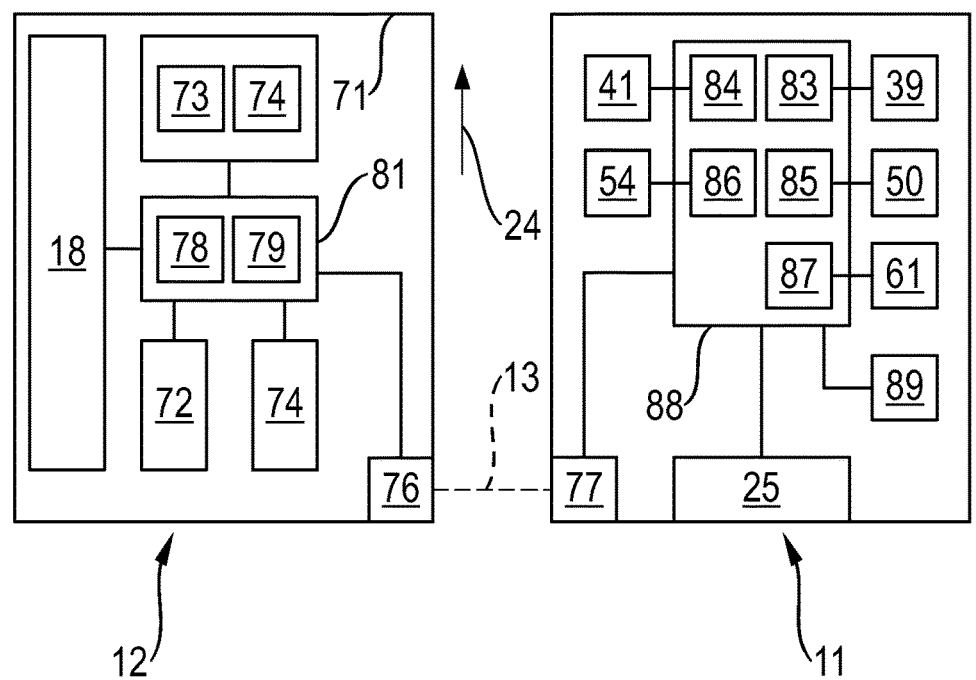

FIGS. 3A, B show laser receiver 12 in a three-dimensional representation (FIG. 3A) and the key components of laser receiver 12 as well as the interaction with rotating laser 11 in a schematic representation (FIG. 3B). Laser receiver 12 is equipped with a measurement function that determines the distance of a laser beam from zero position 19 of detection field 18.

The laser receiver 12 comprises a receiver housing 71, an operating panel 72, a visual display 73, a loudspeaker 74 and detection field 18 with which the position of incidence of a laser beam is registered. Detection field 18 indicates detection height $H_D$ in longitudinal direction 25 and detection width $B_D$ in transverse direction 26. Longitudinal direction 25 corresponds to the measurement direction of laser receiver 12 and transverse direction 26 is aligned perpendicular to longitudinal direction 25, whereby longitudinal and transverse directions 25 and 26 are parallel to detection field 18.

Operating panel 72, visual display 73, loudspeaker 74 and detection field 18 are integrated in receiver housing 71 of laser receiver 12. The user can read off information on laser receiver 12 via visual display 73. For example, this includes a charge status of laser receiver 12, information on wireless communications connection 13 to a rotating laser 11 and the set volume of loudspeaker 74. The distance of a laser beam from zero position 19 of laser receiver 12 can also be indicated visually as a numerical value. As an alternative or in addition to visual indication on visual display 73, can of the distance of the laser beam can be communicated via loudspeaker 74. Zero position 19 of detection field 18 is indicated via marking notch 75 on receiver housing 71.

FIG. 3B shows the primary components of laser receiver 12 and the interaction of laser receiver 12 with rotating laser 11 in the form of a block diagram. Communication between laser receiver 12 and rotating laser 11 is achieved via communications connection 13, which connects a first transmit/receive unit 76 in laser receiver 12 with a second transmit/receive unit 77 in rotating laser 11. For example, first and second transmit/receive units 76 and 77 are implemented as radio modules and communication between laser receiver 12 and rotating laser 11 is achieved via a communications connection 13 that is implemented as a radio connection.

Detection field 18, visual display 73 and loudspeaker 74 are connected to an evaluation unit 78 that is configured in the interior of receiver housing 71. Evaluation unit 78 is connected to a control unit 79 for controlling laser receiver 12, whereby evaluation unit 78 and control unit 79 are integrated in a control system 81 that is implemented as a microcontroller, for example. Laser receiver 12 also comprises a sensor module 82 that is configured in the interior of receiver housing 71 and is connected to control system 81. Sensor module 82 can be used to measure an inclination of laser receiver 12 relative to vertical direction 24. Sensor module 82 comprises a 2-axis accelerometer or two 1-axis accelerometers.

The components of rotating laser 11 that are controlled via control elements or are connected to an evaluation unit include beam source 39, turning device 41, measuring device 50 and leveling device 54 and, if implemented, inclination device 61. An initial control element 83 for controlling beam source 39, a second control element 84 for controlling turning device 41, an evaluation and control element 85 for measuring device 50, a third control element 86 for controlling leveling device 54 and a fourth control element 87 for controlling inclination device 61 can be implemented as separate components or as shown in FIG.

3B, in a common control device 88 that is implemented as a microcontroller, for example. The control elements are connected to the components of rotating laser 11 to be controlled via communications connections.

Rotating laser 11 also comprises a temperature sensor 89 that is configured in housing 31 for rotating laser 11. Temperature sensor 89 measures the temperature in housing 31 and transmits the temperature to control system 89 for rotating laser 11. Because the alignment of inclination sensors 58 and 59 that align the first and second horizontal axes 51 and 52 of rotating laser 11 in the horizontal state are unaffected by temperature and rotating laser 11 can be implemented over a wide temperature range, such as between −20° C. and 50° C., it is advantageous if multiple zero positions υ are saved in control device 88 for rotating laser 11. Multiple first zero positions $υ_1$ for first inclination sensor 57 and multiple second zero positions $υ_2$ for second inclination sensor 58 can be recorded as a function of temperature and stored in a characteristic or table. The zero position associated with the measured temperature is read off from the characteristic or table and the horizontal axis is aligned in the horizontal state defined by the zero position.

Figure 4A:
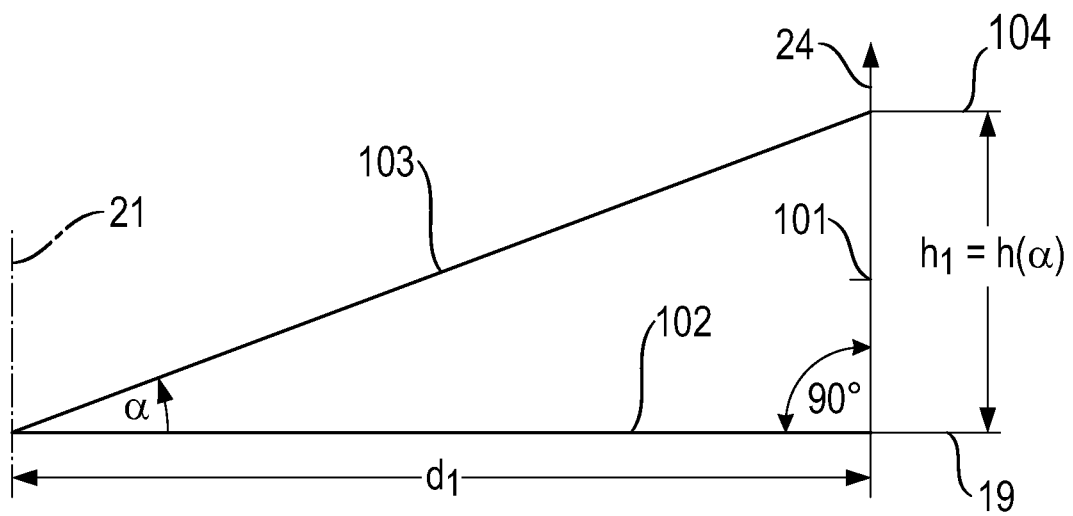
FIGS. 4A-C show three variants of a method according to the invention for measuring a first distance between the rotating laser and the laser receiver with an inclined laser beam.
Figure 4B:
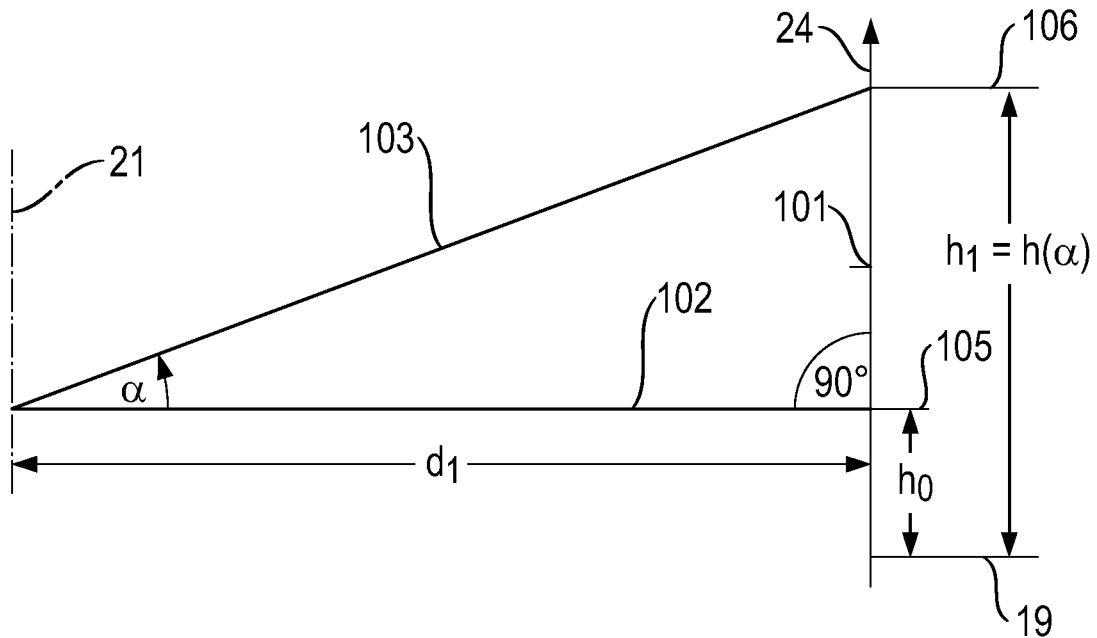
Figure 4C:
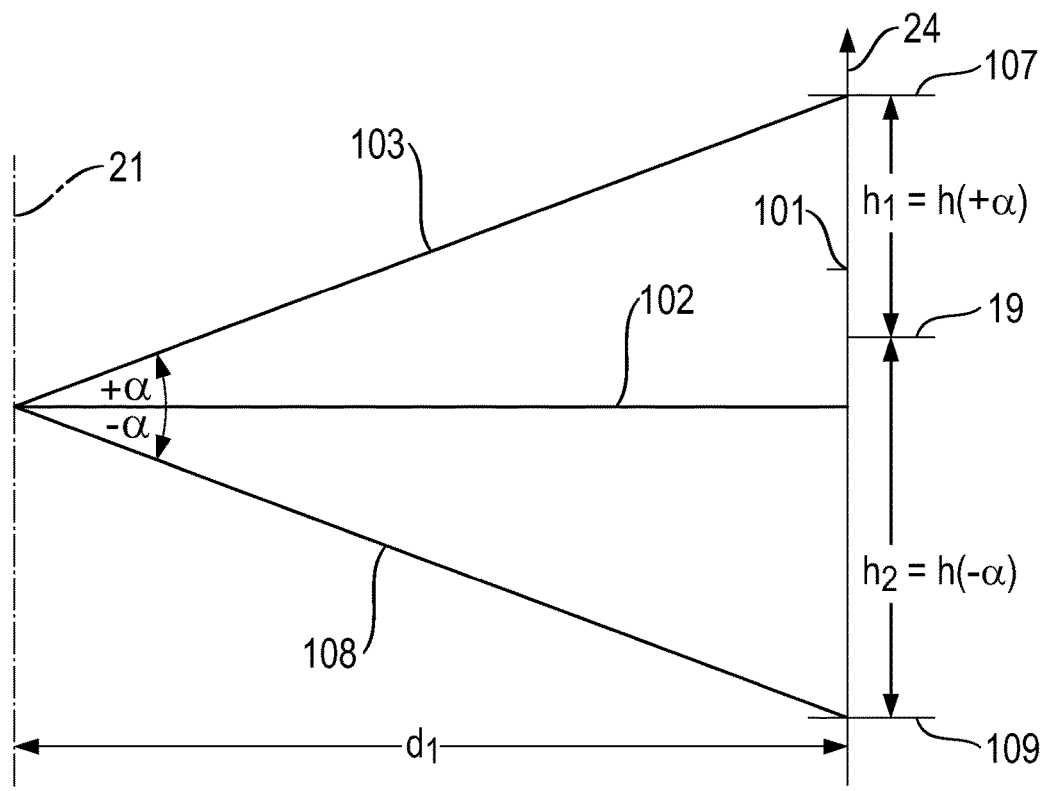

FIGS. 4A-C show three variants of the first measurement procedure with which the horizontal or vertical measurement distance $D_H$, $D_V$ between rotating laser 11 and laser receiver 12 can be determined as a first distance $d_1$. The three variants of the first measurement procedure are presented for the example of the horizontal measurement distance $D_H$; these apply analogously for vertical measurement distance $D_V$. Horizontal measurement distance $D_H$ is measured in the horizontal position of rotating laser 11 and the longitudinal arrangement of laser receiver 12. Longitudinal direction 25 of laser receiver 12 is aligned as parallel as possible to vertical direction 24 and the first distance $d_1$ is measured between axis of rotation 21 of rotating laser 11 and a front side 101 of detection field 18 of laser receiver 12. At the start of the first measurement procedure, horizontal axes 51 and 52 of rotating laser 11 are in the horizontal state or are aligned in the horizontal state. Rotating laser 11 emits a horizontally aligned laser beam 102.

In the first measurement procedure, rotating laser 11 is operated in point mode and the laser beam is not moved about axis of rotation 21. The laser beam is inclined at a known angle of inclination α and the position of incidence of the inclined laser beam on detection field 18 of laser receiver 12 is determined as a measuring point and the height offset of the measuring point is saved as a height. The laser beam can be inclined using leveling device 54 or inclination device 61. Using leveling device 54 has the advantage that measurement distance D can also be determined by rotating lasers 11 without an inclination device 61.

The first measurement procedure requires that rotating laser 11 be aligned with laser receiver 12 such that the direction of inclination is approximately perpendicular to detection field 18 of laser receiver 12. Deviations from perpendicular alignment result in measurement errors that can be tolerated for small deviations. If first horizontal axis 51 is aligned with detection field 18, the laser beam is inclined using first leveling unit 55, which comprises first inclination sensor 58 and first adjusting element 62. If the inclination of the laser beam is performed using inclination device 61, rotating laser 11 must be configured in an angular position by aligning the direction of inclination with detection field 18.

FIG. 4A shows the first variant of the first measurement procedure. Horizontally aligned laser beam 102 is set to zero position 19 of laser receiver 12. The alignment of laser beam 102 with zero position 19 can be achieved with an adjustable-height stand, for example. A stand with a so-called "auto-alignment function", such as is described in European patent EP 1 203 930 B1 is suitable for fully automatic alignment. The laser beam is then inclined by angle of inclination α using the corresponding leveling unit of leveling device 54 or inclination device 61. The position of incidence of inclined laser beam 103 on detection field 18 of laser receiver 12 is determined as a first measuring point 104 and the distance of the first measuring point 104 from zero position 19 is stored as the first height $h_1=h(α)$. The first distance $d_1$ can be calculated from angle of inclination α and a height difference Δh between the first height ($h_1=h(α)$) and zero position 19 of detection field 18. If zero position 19 corresponds to a height of 0 mm, the first distance $d_1$ can be calculated based on $\tan(α)=h(α)/d_1$ be calculated. For a small angle of inclination α, as an approximation $\tan(α) \approx \sin(α)$.

FIG. 4B shows the second variant of the first measurement procedure. Horizontally aligned laser beam 102 is sent to detection field 18 of laser receiver 12. The position of incidence of laser beam 102 on detection field 18 is determined as a reference point 105 and the distance of reference point 105 from zero position 19 is stored as reference height $h_0 \approx h(0°)$.

The laser beam is then inclined by angle of inclination α and the position of incidence of inclined laser beam 103 on detection field 18 is determined as a first measuring point 106 and the distance of the first measuring point 106 from zero position 19 is stored as the first height $h_1=h(α)$. The first distance $d_1$ can be calculated from angle of inclination α and height difference Δh between the first height $h_1=h(α)$ and reference height $h_0=h(0°)$ in accordance with $\tan(α)=(h_1-h_0)/d_1$. For a small angle of inclination α, as an approximation $\tan(α) \approx \sin(α)$.

FIG. 4C shows the third variant of the first measurement procedure. Horizontally aligned laser beam 102 is inclined by angle of inclination α in a positive direction of inclination. The position of incidence of inclined laser beam 103 on detection field 18 is determined as a first measuring point 107 and the distance of the first measuring point 107 from zero position 19 is stored as the first height $h_1=h(+α)$. The laser beam is then inclined in a negative direction of inclination opposite the positive direction of inclination by a negative angle of inclination −α. The position of incidence of inclined laser beam 108 on detection field 18 is determined as a second measuring point 109 and the distance of the second measuring point 109 from zero position 19 is stored as the second height $h_2=h(−α)$. The first distance $d_1$ can be calculated from angle of inclination α and height difference Δh between the first height $h_1=h(+α)$ and the second height $h_2=h(−α)$ in accordance with $\tan(α)=(h(+α)−h(−α))/2d_1$. For a small angle of inclination α, as an approximation $\tan(α) \approx \sin(α)$.

The formulas for calculating the horizontal measurement distance $D_H$ between rotating laser 11 and laser receiver 12 apply for a laser receiver 12 that is aligned parallel with vertical direction 24, and the formulas for calculating the vertical measurement distance $D_V$ apply for a laser receiver 12, the longitudinal direction 25 of which is aligned perpendicular to vertical direction 25. Laser receiver 12 comprises sensor module 82, with which the inclination of laser receiver 12 relative to vertical direction 24 is measured in order to correct measurement errors due to non-vertical alignment of laser receiver 12.

Figure 5A:
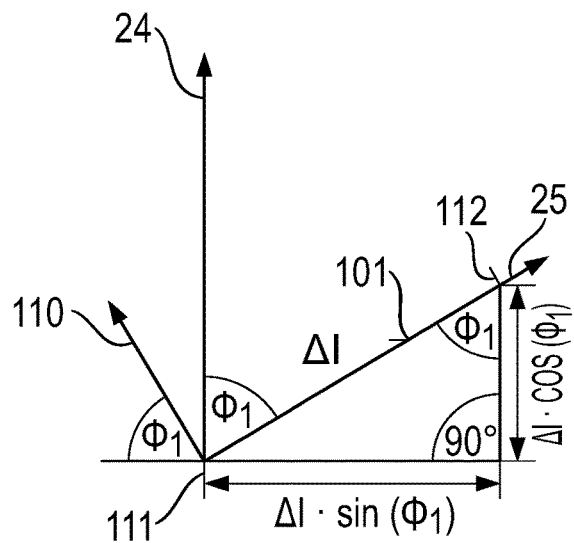
FIGS. 5A, B show a schematic representation of the laser receiver inclined from a vertical direction by a first vertical angle (FIG. 5A) and a second vertical angle (FIG. 5B).
Figure 5B:
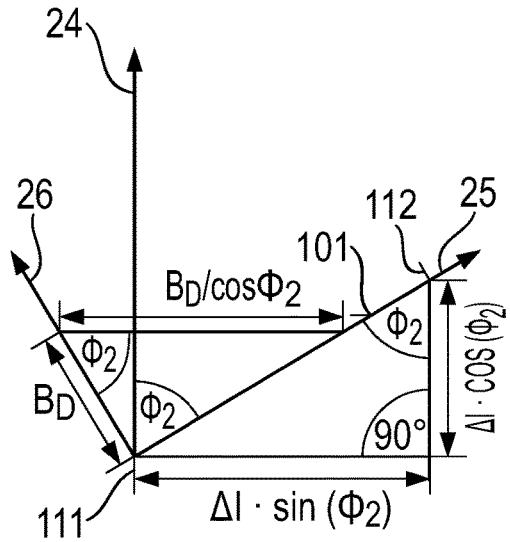

FIGS. 5A, B show the alignment of laser receiver 12 on measurement of horizontal measurement distance $D_H$ in a schematic representation, whereby laser receiver 12 can be inclined relative to direction 24 at a first vertical angle $\varphi_1$, a second vertical angle $\varphi_2$ or the first and second vertical angles, $\varphi_1$ and $\varphi_2$. FIG. 5A shows laser receiver 12, inclined in a first vertical plane by the first vertical angle $\varphi_1$, and FIG. 5B shows laser receiver 12, inclined in a second vertical plane by the second vertical angle $\varphi_2$. The first vertical plane is determined by vertical direction 24 and a normal vector 110 to detection field 18 and the second vertical plane is determined by longitudinal direction 25 and transverse direction 26 of detection field 18. The first vertical angle $\varphi_1$ is measured between normal vector 110 and vertical direction 24, whereby the first vertical angle $\varphi_1$ represents the deviation of 90° between normal vector 110 and vertical direction 24 and the second vertical angle $\varphi_2$ is measured between vertical direction 24 and longitudinal direction 25 of detection field 18.

A first laser beam strikes detection field 18 of laser receiver 12 and generates a first position of incidence 111. A second laser beam strikes detection field 18 of laser receiver 12 and generates a second position of incidence 112. Evaluation unit 78 of laser receiver 12 calculates a distance $\Delta l$ between the first position of incidence 111 and the second position of incidence 112. In the procedure for checking a rotating laser for cone error, distance $\Delta l$ corresponds to the difference $\Delta$ between the first height offset $H_1$ and the second height offset $H_2$, and in the distance measurement with the first measurement procedure, distance $\Delta l$ corresponds to height difference $\Delta h$.

If laser receiver 12 is inclined by the first vertical angle $\varphi_1$ relative to vertical direction 24, vertical distance $v_1$ in the first vertical plane is less than distance $\Delta l$ measured by detection field 18 of laser receiver 12 (FIG. 6A). Relationship $\Delta l \cdot \cos(\varphi_1)$ applies for vertical distance $v_1$. If laser receiver 12 is inclined by the second vertical angle $\varphi_2$ relative to vertical direction 24, vertical distance $v_2$ in the second vertical plane is less than distance $\Delta l$ measured by detection field 18 of laser receiver 12 (FIG. 6B). Relationship $\Delta l \cdot \cos(\varphi_2)$ applies for vertical distance $v_2$. If laser receiver 12 is inclined relative to vertical direction 24 by the first vertical angle $\varphi_1$ and the second vertical angle $\varphi_2$, relationship $\Delta l \cdot \cos(\varphi_1) \cdot \cos(\varphi_2)$ applies for the vertical distance. In the formulas that use the measurement function of laser receiver 12 and measure distances $\Delta l$ on detection field 18, distances $\Delta l$ are multiplied by a correction factor $\cos(\varphi_1) \cdot \cos(\varphi_2)$.

The second vertical angle $\varphi_2$ should also be accounted for in the calculation of the second distance $d_2$ by the second measurement procedure. Because of the inclination of laser receiver 12 by the second vertical angle $\varphi_2$, the horizontal distance that the first rotating laser beam 22 traverses on detection field 18 is larger than the detection width $B_D$ of detection field 18 in transverse direction 26. The signal length of the first rotating laser beam 22 corresponds to the horizontal distance on detection field 18. The relationship $B_D/\cos(\varphi 2)$ applies for the horizontal distance. An inclination of laser receiver 12 by the first vertical angle $\varphi_1$ does not change the horizontal distance that the first rotating laser beam 22 traverses on detection field 18.

Vertical measurement distance $D_V$ is measured in the vertical position of rotating laser 11 and in the transverse arrangement of laser receiver 12. Ideally, longitudinal direction 25 of detection field 18 is aligned parallel to vertical direction 24 and transverse direction 26 of detection field 8 is aligned parallel to vertical direction 24. If laser receiver 12 is inclined by first vertical angle $\varphi_1$ the horizontal distance perpendicular to vertical direction 24 in the first vertical plane is less than distance $\Delta l$ measured by detection field 18 of laser receiver 12; relationship $\Delta l \cdot \cos(90°-\varphi_1) = \Delta l \cdot \sin(\varphi_1)$ applies. If laser receiver 12 is inclined by the second vertical angle $\varphi_2$, the horizontal distance perpendicular to vertical direction 24 in the second vertical plane is less than distance $\Delta l$ measured by detection field 18 of laser receiver 12; relationship $\Delta l \cdot \cos(90°-\varphi_2) = \Delta l \cdot \sin(\varphi_2)$ applies. In the second measurement procedure, the vertical distance in vertical direction 24 due to an inclination of laser receiver 12 by the second vertical angle $\varphi_2$ is greater than detection width $B_D$; relationship $B_D/\cos(90°-\varphi_2) = B_D/\sin(\varphi_2)$ applies.

The invention claimed is:

1. A method for measuring a horizontal measurement distance ($D_H$) or vertical measurement distance ($D_V$) between a rotating laser (11) that emits a first laser beam (22) that is rotatable about an axis of rotation axis (21) and/or a stationary second laser beam (23) and a laser receiver (12) with a detection field (18) with a measurement function, comprising the steps of:

aligning the rotating laser (11) in a horizontal position or a vertical position and aligning the laser receiver (12) in a longitudinal arrangement or a transverse arrangement;

aligning the rotating laser (11) at an angle to the laser receiver, in which a device axis of the rotating laser (11) is aligned towards the detection field (18) of the laser receiver (12); and aligning the rotating laser (11) in a defined state using a leveling device (54), wherein the defined state is formed as a horizontal state in the horizontal position of the rotating laser (11) and as a vertical state in the vertical position of the rotating laser;

wherein the rotating laser (11) is inclined from the defined state by an inclination angle ($\alpha$) in a direction of inclination, an incident position of the inclined laser beam on the detection field (18) of the laser receiver (12) is determined as a first measuring point, a distance of the first measuring point from a zero position of the detection field (18) is stored as a first height ($h_1 = h(\alpha)$), and the measurement distance ($D_H$, $D_V$) between the rotating laser (11) and the laser receiver (12) is determined as a first distance ($d_1$) from the inclination angle ($\alpha$) and the first height ($h_1 = h(\alpha)$).

2. The method according to claim 1, wherein an incident position of the laser beam on the detection field (18) of the laser receiver (12) in the defined state of the rotating laser (11) is determined as a reference point (105), a distance of the reference point (105) from the zero position (19) of the detection field (18) is stored as a reference height ($h_0$), and the first distance ($d_1$) is calculated from the inclination angle ($\alpha$) and a difference ($\Delta h = h_1 - h_0$) between the first height ($h_1$) and the reference height ($h_0$).

3. The method according to claim 1, wherein the laser beam is set to the zero position (19) on the detection field (18) with the rotating laser (11) in the defined state, the laser beam is inclined from the zero position (19) by an inclination angle ($\alpha$) and the first distance ($d_1$) is calculated from the inclination angle ($\alpha$) and a difference between the first height ($h_1 = h(\alpha)$) and the zero position (19) of the detection field (18).

4. The method according to claim 1, wherein the rotating laser (11) is inclined in an opposing direction of inclination by a negative inclination angle ($-\alpha$), an incident position of the oppositely inclined laser beam (108) on the detection field (18) of the laser receiver (12) is determined as a second measuring point (109), a distance of the second measuring point from the zero position (19) of the detection field (18)

is stored as a second height ($h_2=h(-\alpha)$) and the first distance ($d_1$) is calculated from the inclination angle ($\alpha$) and a difference ($\Delta h=h_1-h_2$) between the first height ($h_1=h(\alpha)$) and the second height ($h_2=h(-\alpha)$).

5. The method according to claim 1, wherein the rotating laser (11) is aligned in the horizontal position and the laser receiver (12) is aligned in the longitudinal arrangement and wherein the horizontal measurement distance ($D_H$) between the rotating laser (11) and the laser receiver (12) is also determined as a second distance ($d_2$) by a second measurement procedure, wherein the rotating laser (11) is aligned in the horizontal state, the first laser beam (22) is rotated in the horizontal state with a rotation speed ($v_R$) about the axis of rotation (21) of the rotating laser (11), a signal length of the first laser beam (22) on the detection field (18) of the laser receiver (12) is determined, and the second distance ($d_2$) is calculated from the rotation speed ($v_R$), the signal length, a detection width ($B_D$) of the detection field (18).

6. The method according to claim 5, wherein the horizontal or the vertical measurement distance ($D_H$, $D_V$) between the rotating laser (11) and the laser receiver (12) is calculated as an average distance (d) of the first distance ($d_1$) and the second distance ($d_2$).

7. The method according to claim 1, wherein the rotating laser (11) is aligned in the vertical position and the laser receiver (12) is aligned in the transverse arrangement and the vertical measurement distance (Dv) between the rotating laser (11) and the laser receiver (12) is also determined as a second distance ($d_2$) by a second measurement procedure, wherein the rotating laser (11) is aligned in the vertical state, the second laser beam (23) is rotated in the vertical state with a rotation speed ($v_R$), a signal length of the second laser beam (23) on the detection field (18) of the laser receiver (12) is determined, and the second distance ($d_2$) is calculated from the rotation speed ($v_R$), the signal length, and a detection width ($B_D$) of the detection field (18).

8. The method according to claim 7, wherein the horizontal or the vertical measurement distance ($D_H$, $D_V$) between the rotating laser (11) and the laser receiver (12) is calculated as an average distance (d) of the first distance ($d_1$) and the second distance ($d_2$).

9. The method according to claim 1, wherein an inclination of the laser receiver (12) relative to a vertical direction (24) is determined as a first vertical angle ($\varphi_1$) in a first vertical plane and/or as a second vertical angle ($\varphi_2$) in a second vertical plane, wherein the first vertical plane is determined by the vertical direction (24) and a longitudinal direction (25) of the detection field (18) and the second vertical plane is determined by the vertical direction (24) and a transverse direction (26) of the detection field (18).

10. The method according to claim 9, wherein for measurement of the horizontal measurement distance ($D_H$), the first vertical angle ($\varphi_1$) and/or the second vertical angle ($\varphi_2$) are multiplied by an angle-dependent correction factor ($\cos(\varphi_1)$, $\cos(\varphi_2)$, $1/\cos(\varphi_2)$).

11. The method according to claim 9, wherein for measurement of the vertical measurement distance ($D_V$), the first vertical angle ($\varphi_1$) and/or the second vertical angle ($\varphi_2$) are multiplied by an angle-dependent correction factor ($\cos(90°-\varphi_1)$, $\cos(90°-\varphi_2)$, $1/\cos(90°-\varphi_2)$).

* * * * *